US012214866B2

United States Patent
Kerr et al.

(10) Patent No.: US 12,214,866 B2
(45) Date of Patent: Feb. 4, 2025

(54) AIRCRAFT TAKE-OFF SYSTEM

(71) Applicant: Airbus Operations Limited, Bristol (GB)

(72) Inventors: Sean Kerr, Bristol (GB); David Marles, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 226 days.

(21) Appl. No.: 17/760,940

(22) PCT Filed: Sep. 16, 2020

(86) PCT No.: PCT/EP2020/075878
§ 371 (c)(1),
(2) Date: Mar. 16, 2022

(87) PCT Pub. No.: WO2021/053021
PCT Pub. Date: Mar. 25, 2021

(65) Prior Publication Data
US 2022/0340267 A1    Oct. 27, 2022

(30) Foreign Application Priority Data
Sep. 17, 2019 (GB) .................................... 1913411

(51) Int. Cl.
*B64C 25/26* (2006.01)
*B64C 13/16* (2006.01)
*B64D 31/06* (2024.01)

(52) U.S. Cl.
CPC ............. *B64C 25/26* (2013.01); *B64C 13/16* (2013.01); *B64D 31/06* (2013.01)

(58) Field of Classification Search
None
See application file for complete search history.

(56) References Cited

U.S. PATENT DOCUMENTS

| | | | | |
|---|---|---|---|---|
| 4,319,218 A | * | 3/1982 | Bateman | G05D 1/0653 340/960 |
| 6,854,689 B1 | * | 2/2005 | Lindahl | B64C 25/18 244/102 R |

(Continued)

FOREIGN PATENT DOCUMENTS

| | | | |
|---|---|---|---|
| EP | 2082956 A2 * | 7/2009 | B64C 25/26 |
| EP | 3 415 419 | 12/2018 | |
| WO | 2019/166461 | 9/2019 | |

OTHER PUBLICATIONS

International Search Report and Written Opinion of the International Searching Authority cited in PCT/EP2020/075878, Nov. 20, 2020, 12 pages.

*Primary Examiner* — Joshua J Michener
*Assistant Examiner* — Ka Chun Leung
(74) *Attorney, Agent, or Firm* — Nixon & Vanderhye P.C.

(57) ABSTRACT

An aircraft system (10) for an aircraft (1) including a controller (100) configured to receive at least one signal during a take-off procedure of the aircraft. The signal includes information representative of at least one parameter of the aircraft. The controller is configured to determine whether a current or future aircraft climb rate associated with the take-off procedure meets a criterion, on the basis of the at least one signal. The controller is configured to determine at least one remedial action to be taken, such as performance of at least a portion of a procedure to retract a landing gear of the aircraft, when the controller determines that the aircraft climb rate does not meet the criterion.

14 Claims, 2 Drawing Sheets

(56) References Cited

U.S. PATENT DOCUMENTS

| | | | |
|---|---|---|---|
| 6,880,784 B1 | 4/2005 | Wilkinson et al. | |
| 2003/0225492 A1* | 12/2003 | Cope | G07C 5/008 |
| | | | 701/14 |
| 2010/0222946 A1* | 9/2010 | Sauvinet | G05D 1/0083 |
| | | | 701/15 |
| 2011/0066306 A1* | 3/2011 | Berthereau | B64C 13/16 |
| | | | 701/15 |
| 2012/0316706 A1* | 12/2012 | Guedes | G05D 1/0833 |
| | | | 701/15 |
| 2016/0362177 A1* | 12/2016 | Abarca Lopez | B64C 25/16 |
| 2017/0355473 A1* | 12/2017 | Cahill | B64C 25/34 |
| 2018/0370616 A1* | 12/2018 | Howell | B64C 25/22 |

\* cited by examiner

US 12,214,866 B2

AIRCRAFT TAKE-OFF SYSTEM

This application is the U.S. national phase of International Application No. PCT/EP2020/075878, filed Sep. 16, 2020, which designated the U.S. and claims priority to United Kingdom patent application GB 1913411.3, filed Sep. 17, 2019, the entire contents of each of which are hereby incorporated by reference.

TECHNICAL FIELD

The present invention relates to aircraft systems for aircraft, and to methods of operating controllers of aircraft systems of aircraft during take-off procedures.

BACKGROUND

The rate of climb of an aircraft, hereinafter referred to as "aircraft climb rate" for brevity, during a take-off procedure has to be sufficiently large for the aircraft to be at least at a predetermined height above ground at a predetermined point in the take-off procedure. This may be desirable to ensure that the aircraft is on a correct trajectory for its flight, and/or to avoid airborne and ground-based obstacles by at least a predetermined margin, such as airport boundary fences and runway approach lighting systems (ALS) that the aircraft may pass over during take-off.

Several factors can influence the aircraft climb rate. These include the take-off weight of the aircraft, the capability of wings of the aircraft to generate lift, the status of flight control surfaces of the aircraft, drag created by landing gear of the aircraft, and thrust generated by engine(s) of the aircraft.

Aircraft climb during a take-off procedure typically is confirmed by a pilot or another member of the flight crew looking through a window of the cockpit to check that the aircraft is ascending from the ground or checking an altimeter for an increase in altitude. However, such confirmation tends to occur only a number of seconds after take-off and, at best, permits only an inaccurate estimate of the current rate of climb.

SUMMARY

A first aspect of the present invention provides an aircraft system for an aircraft, the aircraft system comprising a controller that is configured to: receive at least one signal during a take-off procedure of the aircraft; determine whether an aircraft climb rate associated with the take-off procedure meets a criterion, on the basis of the at least one signal; and determine at least one remedial action to be taken, when the controller determines that the aircraft climb rate does not meet the criterion.

Optionally, the aircraft climb rate is a current rate of climb of the aircraft.

Optionally, the aircraft climb rate is a predicted rate of climb of the aircraft at a future stage of the take-off procedure.

Optionally, the at least one remedial action comprises an action intended to increase the aircraft climb rate.

Optionally, the at least one remedial action comprises one or more of: an increase in thrust generated by one or more engines of the aircraft; movement of one or more flight control surfaces of the aircraft to increase lift generated by the flight control surfaces or to reduce drag generated by the flight control surfaces or to counter yaw induced by engine failure; and performance of at least a portion of a procedure to retract a landing gear of the aircraft.

Optionally, the portion of the procedure comprises one or more avionics processes and/or one or more mechanical processes.

Optionally, the portion of the procedure comprises an avionics side change over.

Optionally, the aircraft system comprises an isolator that is configured to isolate at least a part of a landing gear system from a power supply; wherein the portion of the procedure comprises operation of the isolator to enable power to be supplied to at least the part of the landing gear system.

Optionally, the aircraft system comprises one or more landing gear bay door uplocks to retain a landing gear bay door in a closed position when the one or more landing gear bay door uplocks are locked; wherein the portion of the procedure comprises unlocking the, or each, landing gear bay door uplock to permit movement of the landing gear bay door from the closed position to an open position.

Optionally, the portion of the procedure comprises actuating one or more landing gear bay door actuators to move the landing gear bay door further from the open position before the unlocking of the one or more landing gear bay door uplocks, thereby to facilitate the unlocking of the one or more landing gear bay door uplocks.

Optionally, the aircraft system comprises one or more landing gear bay door actuators configured to move a landing gear bay door from a closed position to an open position to permit movement of the landing gear from an extended position to a retracted position; wherein the portion of the procedure comprises the one or more landing gear bay door actuators moving the landing gear bay door from the closed position to the open position.

Optionally, the aircraft system comprises one or more landing gear actuators configured to move the landing gear from an extended position to a retracted position; wherein the portion of the procedure comprises the one or more landing gear actuators moving the landing gear from the extended position to the retracted position.

Optionally, the at least one remedial action comprises an action to interrupt the take-off procedure.

Optionally, the at least one remedial action comprises one or more of: a decrease in thrust generated by one or more engines of the aircraft; operation of one or more brakes of the aircraft to decelerate the aircraft; movement of one or more flight control surfaces of the aircraft to reduce lift generated by the flight control surfaces; and prevention of performance of at least a portion of a procedure to retract a landing gear of the aircraft.

Optionally, the aircraft system comprises a sensor system that is configured to sense at least one condition and to send the at least one signal comprising information representative of the at least one condition to the controller.

Optionally, the sensor system is configured to sense at least part of an environment external to the aircraft and the information comprises surroundings information representative of at least the part of the environment external to the aircraft.

Optionally, the sensor system is configured to sense at least one parameter of the aircraft and the information comprises parameter information representative of the at least one parameter of the aircraft.

Optionally, the at least one parameter of the aircraft comprises at least one parameter relating to one or more engines of the aircraft.

Optionally, the at least one parameter relating to one or more engines of the aircraft comprises one or more of: a temperature or pressure of engine oil; a vibration of at least part of the one or more engines; an amount of thrust generated by the one or more engines; a spool speed of the one or more engines; a temperature of exhaust gas from the one or more engines; and an engine pressure ratio of the one or more engines.

Optionally, the criterion is that the aircraft climb rate matches or exceeds a comparative aircraft climb rate.

Optionally, the controller is configured to: determine the aircraft climb rate on the basis of the at least one signal; and compare the aircraft climb rate with the comparative aircraft climb rate.

Optionally, the criterion is that the aircraft climb rate is sufficient for the aircraft to be at least at a predetermined height above ground at a predetermined point in the take-off procedure.

Optionally, the criterion is that the aircraft climb rate is sufficient for the aircraft to avoid an obstacle, at least by a predetermined margin.

Optionally, the aircraft system comprises a warning device; wherein the controller is configured to cause the warning device to issue a warning, when the controller determines that the aircraft climb rate does not meet the criterion.

Optionally, the controller is configured to cause the at least one remedial action to be taken, when the controller determines that the aircraft climb rate does not meet the criterion.

Optionally, the controller is configured to receive an approval signal indicative of an approval to cause the at least one remedial action to be taken; wherein the controller is configured to cause the at least one remedial action to be taken on the basis of the approval signal.

Optionally, the aircraft system comprises a cockpit flight control that is operable by a member of a flight crew to send the approval signal to the controller.

A second aspect of the present invention provides a method of operating a controller of an aircraft system of an aircraft during a take-off procedure, the method comprising: receiving at least one signal during the take-off procedure; determining whether an aircraft climb rate associated with the take-off procedure meets a criterion, on the basis of the at least one signal; and determining at least one remedial action to be taken, when the determining results in a conclusion that the aircraft climb rate does not meet the criterion.

Optionally, the aircraft climb rate is a current rate of climb of the aircraft. Alternatively, the aircraft climb rate is a predicted rate of climb of the aircraft at a future stage of the take-off procedure.

Optionally, the at least one remedial action comprises an action intended to increase the aircraft climb rate.

Optionally, the at least one remedial action comprises one or more of: an increase in thrust generated by one or more engines of the aircraft; movement of one or more flight control surfaces of the aircraft to increase lift generated by the flight control surfaces or to reduce drag generated by the flight control surfaces or to counter yaw induced by engine failure; and performance of at least a portion of a procedure to retract a landing gear of the aircraft.

Optionally, the portion of the procedure comprises one or more avionics processes and/or one or more mechanical processes.

Optionally, the portion of the procedure comprises an avionics side change over.

Optionally, the aircraft system comprises an isolator that is configured to isolate at least a part of a landing gear system from a power supply; wherein the portion of the procedure comprises operation of the isolator to enable power to be supplied to at least the part of the landing gear system.

Optionally, the aircraft system comprises one or more landing gear bay door uplocks to retain a landing gear bay door in a closed position when the one or more landing gear bay door uplocks are locked; wherein the portion of the procedure comprises unlocking the, or each, landing gear bay door uplock to permit movement of the landing gear bay door from the closed position to an open position.

Optionally, the portion of the procedure comprises actuating one or more landing gear bay door actuators to move the landing gear bay door further from the open position before the unlocking of the one or more landing gear bay door uplocks, thereby to facilitate the unlocking of the one or more landing gear bay door uplocks.

Optionally, the portion of the procedure comprises one or more landing gear bay door actuators moving a landing gear bay door from a closed position to an open position to permit movement of the landing gear from an extended position to a retracted position.

Optionally, the portion of the procedure comprises one or more landing gear actuators moving the landing gear from an extended position to a retracted position.

Optionally, the at least one remedial action comprises an action to interrupt the take-off procedure.

Optionally, the at least one remedial action comprises one or more of: a decrease in thrust generated by one or more engines of the aircraft; operation of one or more brakes of the aircraft to decelerate the aircraft; movement of one or more flight control surfaces of the aircraft to reduce lift generated by the flight control surfaces; and prevention of performance of at least a portion of a procedure to retract a landing gear of the aircraft.

Optionally, the at least one signal comprises information representative of at least one sensed condition.

Optionally, the information comprises surroundings information representative of at least part of an environment external to the aircraft.

Optionally, the information comprises parameter information representative of at least one parameter of the aircraft.

Optionally, the at least one parameter of the aircraft comprises at least one parameter relating to one or more engines of the aircraft, such as one or more of: a temperature or pressure of engine oil; a vibration of at least part of the one or more engines; an amount of thrust generated by the one or more engines; a spool speed of the one or more engines; a temperature of exhaust gas from the one or more engines; and an engine pressure ratio of the one or more engines.

Optionally, the criterion is that the aircraft climb rate matches or exceeds a comparative aircraft climb rate. Optionally, the method comprises: determining the aircraft climb rate on the basis of the at least one signal; and comparing the aircraft climb rate with the comparative aircraft climb rate.

Optionally, the criterion is that the aircraft climb rate is sufficient for the aircraft to be at least at a predetermined height above ground at a predetermined point in the take-off procedure.

Optionally, the criterion is that the aircraft climb rate is sufficient for the aircraft to avoid an obstacle, at least by a predetermined margin.

Optionally, the method comprises causing a warning device to issue a warning, when the determining results in a conclusion that the aircraft climb rate does not meet the criterion.

Optionally, the method comprises causing the at least one remedial action to be taken, when the determining results in a conclusion that the aircraft climb rate does not meet the criterion.

Optionally, the method comprises receiving an approval signal indicative of an approval to cause the at least one remedial action to be taken; wherein the method comprises causing the at least one remedial action to be taken on the basis of the approval signal.

Optionally, the method comprises receiving the approval signal from a cockpit flight control that is operable by a member of a flight crew.

A third aspect of the present invention provides a non-transitory computer-readable storage medium storing instructions that, if executed by a controller of an aircraft system of an aircraft, cause the controller to carry out the method according to the second aspect of the present invention.

A fourth aspect of the present invention provides an aircraft system for an aircraft, the aircraft system comprising: a sensor system that is configured to sense at least one parameter relating to one or more engines of the aircraft during a take-off procedure of the aircraft, and to output information representative of the at least one parameter; a landing gear system that is configured to retract a landing gear of the aircraft; and a control system that is configured to: receive the information from the sensor system; and cause the landing gear system to perform at least a portion of a procedure to retract the landing gear of the aircraft, on the basis of the information.

Optionally, the at least one parameter relating to one or more engines of the aircraft comprises one or more of: a temperature or pressure of engine oil; a vibration of at least part of the one or more engines; an amount of thrust generated by the one or more engines; a spool speed of the one or more engines; a temperature of exhaust gas from the one or more engines; and an engine pressure ratio of the one or more engines.

Optionally, the portion of the procedure comprises one or more avionics processes and/or one or more mechanical processes.

Optionally, the portion of the procedure comprises an avionics side change over.

Optionally, the aircraft system comprises an isolator that is configured to isolate at least a part of the landing gear system from a power supply; wherein the portion of the procedure comprises operation of the isolator to enable power to be supplied to at least the part of the landing gear system.

Optionally, the aircraft system comprises one or more landing gear bay door uplocks to retain a landing gear bay door in a closed position when the one or more landing gear bay door uplocks are locked; wherein the portion of the procedure comprises unlocking the, or each, landing gear bay door uplock to permit movement of the landing gear bay door from the closed position to an open position.

Optionally, the portion of the procedure comprises actuating one or more landing gear bay door actuators to move the landing gear bay door further from the open position before the unlocking of the one or more landing gear bay door uplocks, thereby to facilitate the unlocking of the one or more landing gear bay door uplocks.

Optionally, the aircraft system comprises one or more landing gear bay door actuators configured to move a landing gear bay door from a closed position to an open position to permit movement of the landing gear from an extended position to a retracted position; wherein the portion of the procedure comprises the one or more landing gear bay door actuators moving the landing gear bay door from the closed position to the open position.

Optionally, the aircraft system comprises one or more landing gear actuators configured to move the landing gear from an extended position to a retracted position; wherein the portion of the procedure comprises the one or more landing gear actuators moving the landing gear from the extended position to the retracted position A fifth aspect of the present invention provides an aircraft comprising the aircraft system according to the first or fourth aspect of the present invention or comprising the non-transitory computer-readable storage medium according to the third aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
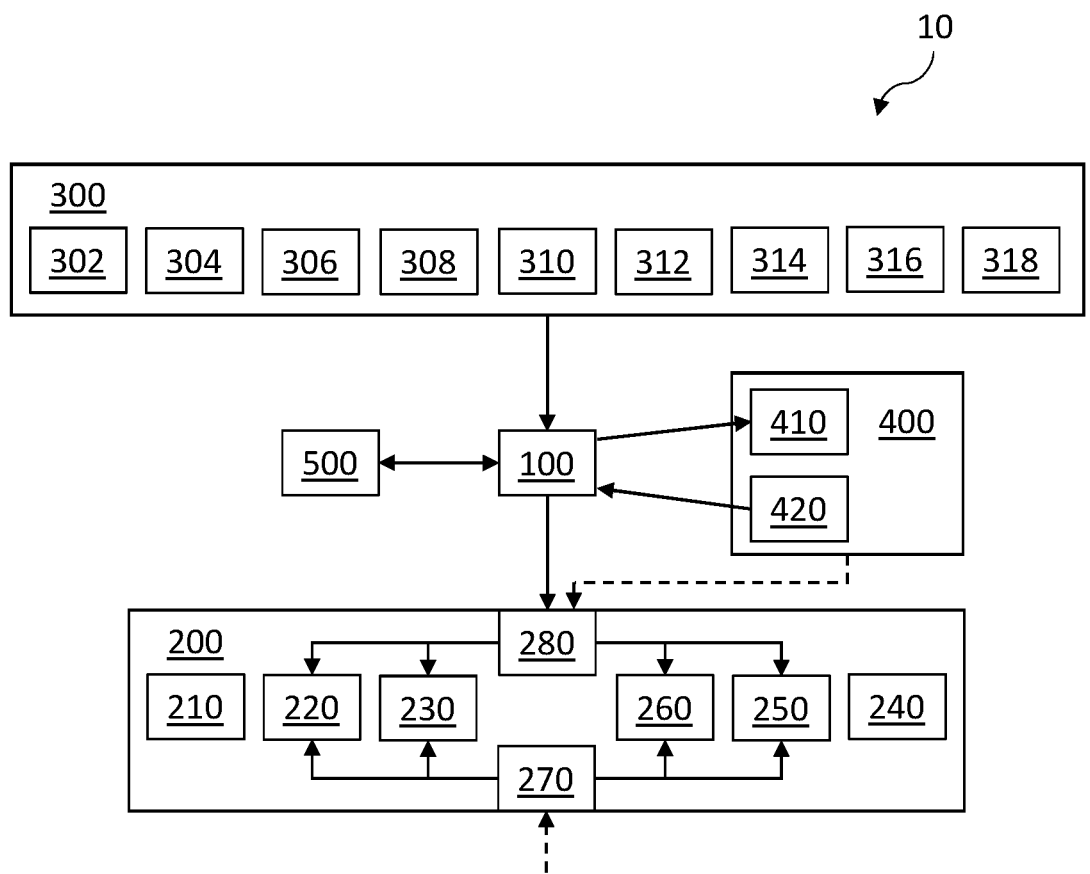
FIG. 1 shows a schematic view of an example of an aircraft system.

In some known aircraft, landing gear is held in an extended position when the aircraft is on the ground and is stowed at a retracted position in a landing gear bay once the aircraft has taken off. Such stowage of the landing gear helps to reduce aircraft drag and noise and the risk of the landing gear being damaged in flight. The landing gear subsequently is extended to the extended position again before the aircraft lands. A landing gear bay door may at least partially cover the landing gear bay when closed, and may be openable to enable movement of the landing gear between the retracted position and the extended position. Movement of the landing gear and the landing gear bay door is typically controlled by a pilot using cockpit flight controls of the aircraft, such as a landing gear control lever.

The take-off procedure is one of the highest workload flight phases for flight crew. Amongst the many considerations they have during this period is the aircraft climb rate, and in particular ensuring that the climb rate is sufficient for the aircraft to be on a correct trajectory for its flight, and to clear any obstacles by a suitable distance. During a take-off procedure, the pilot will typically manually initiate a landing gear retraction procedure upon confirming a positive aircraft climb rate. As noted above, positive climb rate typically is confirmed by the pilot or another member of the flight crew looking through a window of the cockpit to check that the aircraft is ascending from the ground or checking an altimeter or vertical speed indicator for an increase in altitude. Such confirmation may occur only at about three seconds after take-off, and does not enable an accurate estimate of a predicted rate of climb at a future stage of the take-off procedure. Moreover, such a visual confirmation does not enable an accurate estimate of the current rate of climb.

The workload during a take-off procedure can be increased, if a fault or failure occurs in an engine of the aircraft (commonly referred to as a "one engine inoperative", or "OEI", situation) occurs. While the aircraft will have been designed so that the remaining engine(s) can generate sufficient thrust to get the aircraft airborne with an acceptable safety margin, there will nevertheless be a reduction in total thrust generated or generatable by the engine(s) of the aircraft, and thus a lower actual aircraft climb rate for a given amount of commanded thrust. Similarly, a fault or failure with flight control surfaces may reduce the amount of lift generated or generatable. The flight crew then has to spend time diagnosing the problem and deciding on the best remedial action to take.

Some examples discussed herein are concerned with reducing the workload of flight crew is such circumstances. In particular, some examples are concerned with enabling a determination as to whether a current or future aircraft climb rate associated with a take-off procedure meets a given criterion (such as being sufficient to enable the aircraft to achieve a correct or predetermined trajectory for its flight, and/or to avoid obstacles at least by a predetermined amount), and a determination of one or more remedial actions to be taken if the aircraft climb rate does not meet the criterion. Performance of the remedial action(s) may enable the aircraft climb rate to be increased sufficiently, or may result in the take-off being abandoned if the aircraft speed is less than Vi, for example. These and other advantages are achievable while maintaining that authority for performing the remedial action(s) can remain with the pilot or another member of the flight crew. The technology discussed herein has application at least in civil aircraft, military aircraft, and unmanned aerial vehicles (UAVs). Some examples discussed herein are implementable within these areas of application when there is only one flight crew or no flight crew at all.

FIG. 1 shows a schematic view of an aircraft system according to an example. Broadly speaking, the aircraft system 10 comprises a controller 100, a landing gear system 200 that is operatively and communicatively connected to the controller 100, a sensor system 300 that is communicatively connected to the controller 100, and a warning device 410 and a cockpit flight control 420 located in a cockpit 400 of the aircraft. Each of these elements will be briefly discussed in turn.

The controller 100 may take any suitable form. The controller 100 may comprise a processor, such as a microprocessor. Broadly speaking, the controller 100 is configured to receive at least one signal during a take-off procedure of the aircraft; determine whether an aircraft climb rate associated with the take-off procedure meets a criterion on the basis of the at least one signal; and determine at least one remedial action to be taken when the controller determines that the aircraft climb rate does not meet the criterion. Such operations by the controller 100 will be discussed in more detail below.

The landing gear system 200 comprises one or more landing gears 210, one or more landing gear actuators 220, one or more landing gear locks 230, one or more landing gear bay doors 240, one or more landing gear bay door actuators 250, one or more landing gear bay door uplocks 260, an isolator 270, and a landing gear system controller 280. The landing gear 210 is movable between a retracted position and an extended position. The landing gear bay door 240 is movable between a closed position and an open position.

The landing gear bay door 240 is associated with a landing gear bay (not shown). The landing gear bay door 240 at least partially covers the landing gear bay when in the closed position. The landing gear 210 is at least partially positioned in the landing gear bay when in the retracted position. This way, the landing gear bay door 240 helps to protect the landing gear bay, and the landing gear 210 when stowed in the bay, from debris that might be thrown towards the bay while the aircraft is moving on the ground or in flight. Moreover, the landing gear bay door 240 helps to reduce drag (i.e. create an aerodynamically-cleaner aircraft) when closed, as compared to when the bay is exposed. The landing gear bay door 240 is movable to the open position, at which movement of the landing gear 210 between the extended position and the retracted position is permitted.

The landing gear bay door actuator 250 is for moving the landing gear bay door 240 between the closed position and the open position, to permit movement of the landing gear 210 between the extended position and the retracted position. The landing gear bay door actuator 250 may be hydraulically-actuated, electro-hydraulically-actuated, electrically-actuated lock, or mechanically-actuated, for example.

The landing gear bay door uplock 260 is for retaining the landing gear bay door 240 in the closed position. In some cases, the landing gear bay door uplock 260 may be omitted. For example, the landing gear bay door 240 may be held in the closed position by the landing gear bay door actuator 250 or by a mechanical linkage. The landing gear bay door uplock 260 may be hydraulically-actuated, electro-hydraulically-actuated, electrically-actuated lock, or mechanically-actuated, for example.

The landing gear actuator 220 is for moving the landing gear 210 between the extended position and the retracted position. The landing gear actuator 220 may be hydraulically-actuated, electro-hydraulically-actuated, electrically-actuated lock, or mechanically-actuated, for example.

The landing gear lock 230 is for retaining the landing gear 210 in the extended position. In some cases, the landing gear lock 230 may be omitted. For example, the landing gear 210 may be held in the extended position by the landing gear actuator 220 or by a mechanical linkage. The landing gear lock 230 may be hydraulically-actuated, electro-hydraulically-actuated, electrically-actuated lock, or mechanically-actuated, for example.

Power may be supplied to the landing gear system 200 from a power supply (not shown), such as an electric or hydraulic power supply, via the isolator 270 as indicated by the dashed arrow approaching the isolator 270 in FIG. 1. The isolator 270 is operable to selectively isolate at least a part of a landing gear system 200 from the power supply, such as when the landing gear system 200 is not in use. This may be the case when the landing gear 210 is fully extended or retracted and the landing gear bay door 240 is closed.

The landing gear system controller 280 is configured to cause actuation of the actuators 220, 250, the uplock 260 and the lock 230 as required. For example, this may be in in response to commands received at the landing gear system controller 280 from cockpit flight controls that are located in the cockpit 400 and operable by flight crew (as indicated by the other dashed arrow in FIG. 1), or in response to instructions received at the landing gear system controller 280 from the aircraft system controller 100 (as indicated by the solid arrow connecting the controller 100 and the landing gear system controller 280 in FIG. 1).

The sensor system 300 in this example comprises multiple different sensors 302-318. In other examples, any one or more of the sensors 302-318 may be omitted. Each of the sensors 302-318, and thus the sensor system 300 as a whole, is configured to sense a condition and to send the at least one signal mentioned above to the controller 100. The at least one signal comprises information representative of the condition(s).

More specifically, in this example, the sensors 302-318 comprise:

- at least one engine oil temperature sensor 302 that is configured to sense a temperature of engine oil of an engine of the aircraft;
- at least one engine oil pressure sensor 304 that is configured to sense a pressure of engine oil of an engine of the aircraft;
- at least one engine vibration sensor 306 that is configured to sense vibration of at least part of one or more engines of the aircraft;
- at least one thrust sensor 308 that is configured to sense an amount of thrust generated by the one or more engines;
- at least one spool speed sensor 310 that is configured to sense a spool speed of the one or more engines, e.g. when the one or more engines is a gas turbine;
- at least one engine temperature sensor 312 that is configured to sense a temperature of the one or more engines;
- at least one engine pressure ratio sensor 314 that is configured to sense an engine pressure ratio of the one or more engines;
- at least one flight control surface sensor 316 that is configured to sense a position or status of at least one flight control surface of the aircraft; and
- at least one environment sensor 318, such as a camera, a LIDAR sensor, a SONAR or a RADAR, that is configured to sense at least part of an environment external to the aircraft, such as a region in front of and/or below the aircraft, for example to assist in determining the rate of climb of the aircraft, or in detecting obstacles.

Therefore, in this example, several 302-316 of the sensors 302-318, and thus the sensor system 300 as a whole, are configured to sense at least one parameter of the aircraft itself (such as at least one parameter relating to one or more engines of the aircraft), and the information comprised in the at least one signal comprises parameter information representative of the at least one parameter of the aircraft. These sensors 302-316 may be considered aircraft parameter sensors 302-316. Given the teaching of the present disclosure, the skilled person will be able to identify other relevant aircraft parameter sensors, the outputs of which are suitable for use with the present disclosure. Moreover, in this example, one 318 of the sensors 302-318 is configured to sense at least part of an environment external to the aircraft, and the information comprised in the at least one signal comprises surroundings information representative of at least the part of the environment external to the aircraft.

The warning device 410 is a device that is configured to emit a warning to flight crew in the cockpit 400. The warning may be an audible warning such as a beep, ring or buzz, and/or a visual warning such as a flashing light or illuminated indicia, and/or a tactile warning such as a vibration. The purpose of the warning device 410 will be described below. In some other examples, the warning device 410 is omitted.

The cockpit flight control 420 is a control that is operable by a member of the flight crew to send an approval signal to the controller 100, as will be described in more detail below. It may, for example, comprise a lever, a button, a different type of user-movable device, a touchpad, a touchscreen, a gesture-operable device, a voice-operable device, or any combination thereof. In some other examples, the cockpit flight control 420 is omitted.

Several 302-314 of the sensors 302-318 discussed above are thus suitable to sense an engine fault or failure (e.g. an OEI situation) and to advise the controller 100 accordingly. For example, the at least one engine oil temperature sensor 302 may sense that the temperature of the engine oil is outside a predetermined range, or the at least one engine oil pressure sensor 304 may sense that the pressure of the engine oil is outside a predetermined range, or the at least one engine vibration sensor 306 may sense vibration that is above a predetermined magnitude and/or of a frequency that is outside of a predetermined range. Similarly, the at least one thrust sensor 308 may sense that the thrust generated is below a commanded amount of thrust, or the at least one spool speed sensor 310 may sense that the spool speed is below a spool speed that should be achieved for a commanded amount of thrust, or the at least one exhaust gas temperature sensor 312 may sense that the temperature of exhaust gas is outside of a predetermined range, or the at least one engine pressure ratio sensor 314 may sense that the engine pressure ratio is below a predetermined threshold. Each of these sensed parameters or conditions may be indicative of an engine that is underperforming or otherwise malfunctioning. Such underperformance or malfunctioning of an engine can result in insufficient thrust being generated to achieve a predetermined aircraft climb rate during a take-off procedure.

Moreover, if the at least one flight control surface sensor 316 senses that the position of at least one flight control surface of the aircraft does not match a commanded position, this could be an indication that the flight control surface or its actuator mechanism is malfunctioning. Such circumstances can result in insufficient lift being generated by the flight control surface to achieve a predetermined aircraft climb rate during a take-off procedure.

Furthermore, if the at least one environment sensor 318 senses an obstacle in the path of the aircraft or within a predetermined distance of the path during a take-off procedure, this could be an indication that the aircraft climb rate associated with the take-off procedure is insufficient to allow the aircraft to avoid the obstacle by a predetermined margin. The controller 100 or another calculator remote from the controller 100 may determine whether the obstacle is in the path or within the predetermined distance of the path, by identifying a location of the obstacle using the output from the at least one environment sensor 318 and data from relevant aircraft systems that indicate the flight path.

The at least one signal sent by the sensor(s) 302-318 to the controller 100 thus comprises parameter or surroundings information representative of at least one of these sensed conditions. As noted above, on the basis of the at least one signal received from the sensor system 300, the controller 100 is configured to then determine whether an aircraft climb rate associated with the take-off procedure meets a criterion. The controller 100 itself may be configured to calculate the aircraft climb rate. Alternatively, a calculator remote from the controller 100 may calculate the aircraft climb rate and then send it to the controller 100.

The aircraft climb rate that is the subject of this determination may be a current rate of climb of the aircraft, i.e.

when the aircraft is airborne. Such a current rate of climb can be determined by taking altitude measurements at predetermined points in time, and calculating the rate of change of altitude between those points in time. The altitude measurements may be taken using a pressure altimeter, a sonic altimeter, a radio altimeter, a RADAR altimeter, a satellite-based radio-navigation system (such as the Global Positioning System, or "GPS"), or the like.

Alternatively, the aircraft climb rate that is the subject of the determination may be a predicted rate of climb of the aircraft at a future stage of the take-off procedure. Such a predicted rate of climb could be determined either when the aircraft is still on the ground, or when the aircraft is already airborne but it is intended to increase the aircraft's height above ground. Such a predicted rate of climb may be determined using a climb model, which may be stored in memory 500 that the controller 100 (or remote calculator) is able to access. The climb model may comprise an algorithm that takes numerous factors as inputs and produces an estimated climb rate as an output. The factors may comprise, for example, the type of aircraft, the take-off weight of the aircraft, the centre of gravity of the aircraft, atmospheric (e.g. temperature, pressure, altitude) and topographical information associated with the aircraft's location, thrust and flight control surface settings that have been set for the take-off procedure, and outputs of the aircraft parameter sensors 302-316.

Once the current or predicted aircraft climb rate has been calculated or otherwise determined, the controller 100 is configured to determine whether the current or predicted aircraft climb rate meets the criterion.

The criterion may, for example, be that the aircraft climb rate is sufficient for the aircraft to be at least at a predetermined height above ground at a predetermined point in the take-off procedure. The predetermined point may be a current point in the take-off procedure or a future point in the take-off procedure. The point may be temporal or geographic, for example. That is, the predetermined point in the take-off procedure may be a particular point in time measured from a start point in time, or a particular location of the aircraft. The start point in time may, for example, be a time at which the aircraft began accelerating from rest at the beginning of the take-off procedure, a time at which the aircraft was travelling along the ground at a given speed, a time at which the aircraft rotated, or a time at which the aircraft entirely left the ground. The location may, for example, be a specific location or coordinate on or above the Earth, such as the location of an airport boundary or another aircraft or other obstacle, or a location as measured relative to a reference location, such as a reference location where the aircraft rotated or entirely left the ground. Therefore, in some examples, the criterion is that the aircraft climb rate is sufficient for the aircraft to achieve a predetermined trajectory and/or to avoid airborne and ground-based obstacles, at least by a predetermined margin. If the controller 100 determines that the current or predicted aircraft climb rate is insufficient for this purpose, then the controller 100 proceeds to determine at least one remedial action to be taken.

Alternatively, the criterion may be that the current or future aircraft climb rate matches or exceeds a comparative aircraft climb rate. Such a comparative aircraft climb rate may be determined using the climb model discussed above, but without the outputs of the aircraft parameter sensors 302-316 as inputs. That is, the comparative aircraft climb rate may be a theoretical aircraft climb rate that is based on a perfectly functional aircraft. The controller 100 may be configured to determine the current or predicted aircraft climb rate on the basis of the at least one signal, and then compare the current or predicted aircraft climb rate with the comparative aircraft climb rate. If the controller 100 determines that the current or predicted aircraft climb rate does not match or exceed the comparative aircraft climb rate, then the controller 100 proceeds to determine at least one remedial action to be taken.

In some examples, the controller 100 is configured to cause the warning device 410 to issue a warning, when the controller 100 determines that the aircraft climb rate does not meet the criterion. The warning can alert the flight crew to the non-compliance of the aircraft climb rate to the criterion. This can, for example, enable them to log the issue for investigation by a maintenance crew, enable them to take some action to address the issue, may serve as forewarning that the controller 100 is going to cause the remedial action(s) to take place, or may serve as an explanation as to why the remedial action(s) has/have taken place. In other examples, no such warning may be given.

In some examples, the controller 100 is configured to cause the at least one (e.g. plural) remedial action to be taken, when the controller 100 determines that the current or predicted aircraft climb rate does not meet the criterion. That is, once the controller 100 has determined the remedial action(s), it or they are performed. This may be before, during or after emission of the warning by the warning device 410, when present. Beneficially, this can result in the non-compliant aircraft climb rate being promptly addressed and a reduction in workload for the flight crew. However, in some other examples, approval must be given (such as by the flight crew) before the at least one remedial action is taken. Therefore, in some examples, the controller 100 is configured to receive an approval signal indicative of an approval to cause the at least one remedial action to be taken, and to cause the at least one remedial action to be taken on the basis of the approval signal. In some such examples, the cockpit flight control 420 located in a cockpit 400 is operable by a member of the flight crew to send the approval signal to the controller. Thus, the flight crew retains authority for the remedial action(s) to be taken. However, removing the need for the flight crew to diagnose the issue still acts to lessen their workload.

In some examples, aircraft climb rate is not considered, and the controller 100 or control system is configured to receive the information from the sensor system 300; and to cause the landing gear system to perform at least a portion of a procedure to retract the landing gear of the aircraft, on the basis of the information.

In some examples, the at least one remedial action comprises an action intended to increase the current or predicted future aircraft climb rate. For example, the at least one remedial action may comprise one or more of: an increase in thrust generated by one or more engines of the aircraft; movement of one or more flight control surfaces (such as flaps) of the aircraft to increase lift generated by the flight control surfaces or to reduce drag generated by the flight control surfaces; and performance of at least a portion of a procedure to retract landing gear of the aircraft.

The effect on climb performance of increasing thrust and lift is self-explanatory. As regards landing gear retraction, it is to be noted that a key enabler for improved climb performance is drag reduction, and a large variable drag contributor during take-off is landing gear. Therefore, the quicker that landing gear can be retracted when aircraft climb rate is too low, the better the chances of the aircraft climb rate subsequently meeting the criterion.

It is to be noted that, in this example, the controller 100 causing performance of at least a portion of a procedure to retract landing gear involves the controller 100 suitably instructing or informing the landing gear controller 280 to perform accordingly. In other examples, the controller 100 and the landing gear controller 280 may be combined, so that the controller 100 itself suitably communicates with and commands the actuators 220, 250, the uplock 260 and the lock 230.

The portion of the procedure to retract landing gear may comprise operation of the isolator 270 to enable power to be supplied to at least the part of the landing gear system 200. As noted above, the isolator 270 may initially have been set to disconnect the part of the landing gear system 200 from the power supply.

The portion of the procedure may comprise one or more avionics processes and/or one or more mechanical processes. The avionics may function to check on the state of one or more components of the landing gear system 200. The avionics may be configured to control one or more components of the landing gear system 200.

Aircraft sometimes have first and second substantially identical avionics systems for redundancy purposes. The portion of the procedure may comprise an avionics side change over, during which the avionics system enabled for the take-off procedure is switched from one of the available systems to the other. This avoids either avionics system being dormant for a prolonged period, which in turn helps to keep each system well exercised and enables earlier fault identification.

The portion of the procedure may comprise unlocking the, or each, landing gear bay door uplock 260 to permit movement of the landing gear bay door 240 from the closed position to the open position. The portion of the procedure may comprise actuating the one or more landing gear bay door actuators 250 to move the landing gear bay door 240 further from the open position before the unlocking of the, or each, landing gear bay door uplock 260, thereby to reduce the load on the uplock(s) 260 and thus facilitate unlocking of the, or each, uplock 260.

In some cases, the portion of the procedure may exclude actuation of the one or more landing gear bay door actuators 250 to move the landing gear bay door 240 to the open position, and the one or more landing gear actuators 220. Therefore, actuation of these actuators 220, 250 may remain under the control of the flight crew, so that the flight crew retain authority for causing actual opening of the landing gear bay door 240 and retraction of the landing gear 210. Nevertheless, the controller 100 causing performance of the other actions noted above reduces the time required to subsequently retract the landing gear 210 when the flight crew commands the retraction. This may be particularly the case when these other actions involve avionics, because functions involving avionics can cause latency. For instance, hydraulic or electrical valves or switches take time to respond to avionic signals. Moreover, movement of a landing gear bay door from a closed position to an open position typically takes in the order of three seconds. Furthermore, as mentioned above, during a take-off procedure, the pilot will conventionally initiate a landing gear retraction procedure only upon confirming a positive rate of aircraft climb, and such confirmation may occur at about three seconds after take-off. Therefore, conventionally, about six or more seconds elapse after take-off before the landing gear actually begins to be retracted. The more of this procedure that can be completed before the flight crew commands landing gear retraction, the quicker the landing gear will be retracted after the command is given, and thus the quicker the aircraft can be aerodynamically cleaned to reduce drag.

In some examples, the portion of the procedure may comprise the one or more landing gear bay door actuators 250 moving the landing gear bay door 240 from the closed position towards the open position. Again, actuation of the one or more landing gear actuators 220 may remain under the control of the flight crew, but the landing gear controller 280 causing automatic opening of the landing gear bay door 240 still further reduces the time required to subsequently retract the landing gear when the flight crew commands the retraction. As such, some of the aircraft systems described herein enable movement of the landing gear bay door 240 from the closed position towards the open position to be initiated sooner, such as before take-off, on take-off, or immediately after take-off. Therefore, subsequent movement of the landing gear 210 from the extended position towards the retracted position may also be initiated sooner after take-off, for example in the order of three seconds sooner. This helps to reduce drag sooner, which could have a positive impact on the aircraft climb rate.

In still further examples, the portion of the procedure may comprise the one or more landing gear actuators 220 moving the landing gear 210 from the extended position to the retracted position, although this should only be performed when it is known that the aircraft is off the ground. Such an airborne state may be determined by the landing gear controller 100 by any method known in the art, such as through the use of sensors for sensing landing gear wheel speed or load, sensors (such as radio altimeters) for sensing a height of the aircraft above the ground, or other suitable sensors that will be apparent to the skilled reader.

The portion of the procedure may further comprise the one or more landing gear bay door actuators 250 subsequently moving the landing gear bay door 240 from the open position to the closed position, to make the aircraft aerodynamically cleaner. Accordingly, in some examples, there may be no need for the flight crew to instigate performance of any portion of the procedure. It will be appreciated that this may advantageously reduce their workload during the take-off procedure.

Therefore, in some examples, the controller 100 is able to monitor engine performance, for example, by way of the signal(s) received from the sensor system 300. If the controller 100 determines that the engine performance drops below a predetermined threshold, then the landing gear controller 280 may be commanded to retract the landing gear, overriding the landing gear lever position. The controller 100 may cause the warning device 410 to issue a warning to the flight crew, to alert them to the fact that the landing gear and the landing gear lever are in conflicting positions and that the landing gear has been retracted automatically, so that the flight crew can move the landing gear lever to the UP position.

The above examples concern remedial actions that are intended to increase the aircraft climb rate. However, in some examples, the at least one remedial action may comprise an action intended to interrupt the take-off procedure. For example, the at least one remedial action may comprise one or more of: a decrease in thrust generated by one or more engines of the aircraft; operation of one or more brakes of the aircraft to decelerate the aircraft; movement of one or more flight control surfaces of the aircraft to reduce lift generated by the flight control surfaces; and prevention of performance of at least a portion of a procedure to retract landing gear of the aircraft. Some of these actions should only be performed when it is known that the aircraft is on the ground. Such a state may be determined by the controller 100 by any method known in the art, such as through the use of sensors for sensing landing gear wheel speed or load, sensors (such as radio altimeters or proximity sensors to measure the extension of a landing gear shock absorber such as an oleo-strut) for sensing a height of the aircraft above the ground, or other suitable sensors that will be apparent to the skilled reader. Moreover, some of these actions should only be performed when it is known that there is sufficient runway ahead of the aircraft for it to come to a stop safely. This may be determined based on the aircraft's ground speed and geographical location, both of which can be determined using any suitable technologies in the art.

The controller 100 may be active to perform the above processes only during take-off procedures. It may analyse the current or predicted aircraft climb rate periodically or continually during the take-off procedure. In some examples, the flight crew may be able to override the controller 100. In some examples, the controller 100 may be configured to record or report trends in the signals output by the sensor system 300, so as to aid predictive maintenance.

Figure 2:
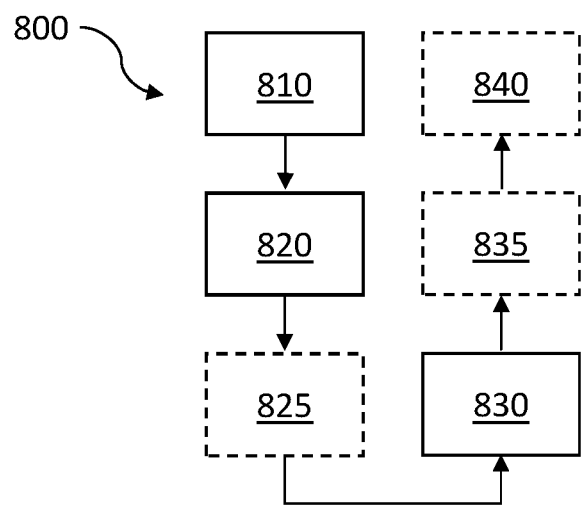
FIG. 2 is a flow diagram showing an example of a method of operating a controller of an aircraft system of an aircraft during a take-off procedure.

FIG. 2 is a flow diagram showing an example of a method of operating a controller of an aircraft system of an aircraft during a take-off procedure. The method 800 may be performed by the controller 100 discussed herein or any variant thereof discussed herein, for example. The method 800 comprises: receiving 810 at least one signal during the take-off procedure; determining 820 whether an aircraft climb rate (such as a current or a predicted climb rate) associated with the take-off procedure meets a criterion, on the basis of the at least one signal; and determining 830 at least one remedial action (such as an action intended to increase the aircraft climb rate, or an action to interrupt the take-off procedure) to be taken, when the determining results in a conclusion that the aircraft climb rate does not meet the criterion.

In some examples, the at least one remedial action comprises an action intended to increase the aircraft climb rate. In some examples, the at least one remedial action comprises one or more of: an increase in thrust generated by one or more engines of the aircraft; movement of one or more flight control surfaces of the aircraft to increase lift generated by the flight control surfaces or to reduce drag generated by the flight control surfaces or to counter yaw induced by engine failure; and performance of at least a portion of a procedure to retract a landing gear of the aircraft (as discussed in more detail above).

In some examples, the at least one remedial action comprises an action to interrupt the take-off procedure. In some examples, the at least one remedial action comprises one or more of: a decrease in thrust generated by one or more engines of the aircraft; operation of one or more brakes of the aircraft to decelerate the aircraft; movement of one or more flight control surfaces of the aircraft to reduce lift generated by the flight control surfaces; and prevention of performance of at least a portion of a procedure to retract a landing gear of the aircraft.

In some examples, the at least one signal comprises information representative of at least one sensed condition, such as an environment external to the aircraft or at least one parameter of the aircraft, as discussed above in more detail.

In some examples, the method comprises causing 825 a warning device to issue a warning, when the determining results in a conclusion that the aircraft climb rate does not meet the criterion.

In some examples, the method comprises causing 840 the at least one remedial action to be taken, when the determining 820 results in a conclusion that the aircraft climb rate does not meet the criterion.

In some examples, the method comprises receiving 835 an approval signal indicative of an approval to cause the at least one remedial action to be taken (such as from a cockpit flight control that is operable by a member of a flight crew); and the method comprises causing 840 the at least one remedial action to be taken on the basis of the approval signal.

Figure 3:
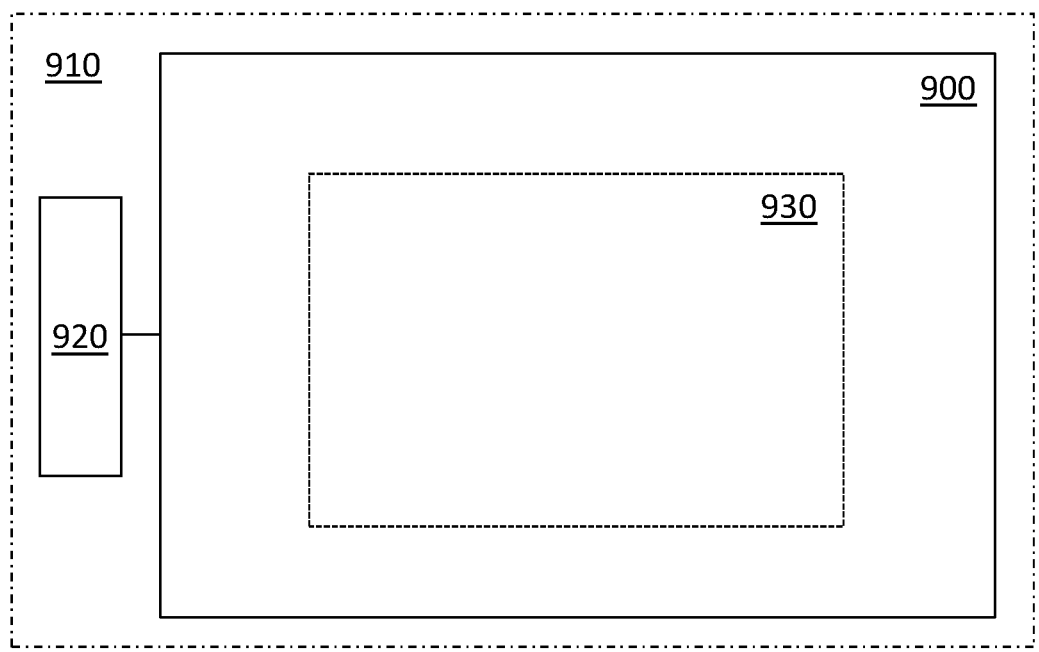
FIG. 3 is a schematic diagram of an example of a non-transitory computer-readable storage medium.

FIG. 3 shows a schematic diagram of a non-transitory computer-readable storage medium 900 according to an example. The non-transitory computer-readable storage medium 900 stores instructions 930 that, if executed by a processor 920 of a controller 910 of an aircraft, cause the processor 920 to perform one of the methods described herein. In some examples, the controller 910 is the controller 100 described above with reference to FIG. 1 or a variant thereof described herein. The instructions 930 comprise: receiving at least one signal during the take-off procedure; determining whether an aircraft climb rate associated with the take-off procedure meets a criterion, on the basis of the at least one signal; and determining at least one remedial action to be taken, when the determining results in a conclusion that the aircraft climb rate does not meet the criterion. The instructions 930 may comprise instructions to perform any of the methods 800 described above with reference to FIG. 2.

Figure 4:
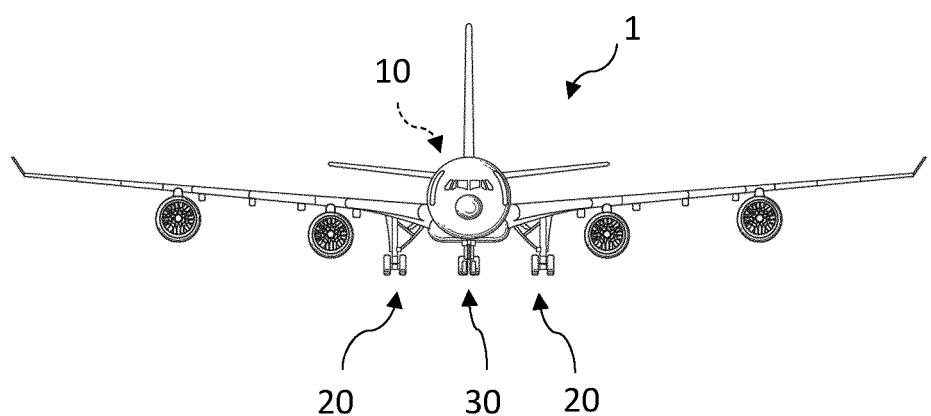
FIG. 4 is a schematic front view of an example of an aircraft.

FIG. 4 is a schematic front view of an aircraft 1. The aircraft 1 comprises two main landing gears 20 and a nose landing gear 30. The aircraft 1 also comprises an aircraft system 10 as discussed herein, such as the aircraft system 10 discussed herein with reference to FIG. 1. The aircraft system 10 may be operatively connected to all of the landing gears 20, 30 or just to one or some of the landing gears, such as the main landing gears 20. The aircraft 1 also comprises the non-transitory computer-readable storage medium 900 discussed herein with reference to FIG. 3.

It is to noted that the term "or" as used herein is to be interpreted to mean "and/or", unless expressly stated otherwise.

Although the invention has been described above with reference to particular examples, it will be appreciated that various changes or modification may be made without departing from the scope of the invention as defined by the appended claims.

The invention claimed is:

1. An aircraft system for an aircraft, the aircraft system comprising a controller configured to:
   receive at least one signal during a take-off procedure of the aircraft indicative of a fault or failure of an engine of the aircraft; and
   on the basis of the at least one signal, causing at least one remedial action to be taken to increase a rate of climb of the aircraft, wherein the at least one remedial action includes performing a portion of a retraction procedure to retract a landing gear of the aircraft,
   wherein the at least one signal indicates that an operating condition of the engine is beyond a predetermined range or a predetermined threshold.

2. The aircraft system according to claim 1, further comprising one or more landing gear bay door actuators configured to move a landing gear bay door from a closed position to an open position to permit movement of the landing gear from an extended position to a retracted position;

wherein the portion of the retraction procedure comprises the one or more landing gear bay door actuators moving the landing gear bay door from the closed position to the open position.

3. The aircraft system according to claim 1, further comprising one or more landing gear actuators configured to move the landing gear from an extended position to a retracted position;
   wherein the controller is configured to determine when the aircraft leaves the ground, and
   wherein the portion of the retraction procedure comprises the one or more landing gear actuators moving the landing gear from the extended position to the retracted position in response to the controller determining that the aircraft has left the ground.

4. The aircraft system according to claim 1, further comprising a sensor system configured to sense a parameter of the aircraft relating to the engine and to send to the controller the at least one signal comprising information representative of the parameter.

5. The aircraft system according to claim 1, further comprising:
   a movable landing gear lever in a cockpit of the aircraft, and
   a warning device in the cockpit;
   wherein the controller is configured to cause the warning device to issue a warning in response to the controller determining that a current physical position of the landing gear conflicts with a current physical position of the landing gear lever.

6. An aircraft comprising the aircraft system according to claim 1.

7. The aircraft system of claim 1, wherein the portion of the retraction procedure includes an avionics side change over.

8. The aircraft system of claim 1, further comprising an isolator configured to supply power to the landing gear, and
   wherein the portion of the retraction procedure includes operation of the isolator to apply power to the landing gear.

9. The aircraft system of claim 1, wherein the controller is further configured to:
   receive at least one additional signal during the take-off procedure indicative of a climb rate of the aircraft;
   determine if the climb rate meets a climb rate criterion,
   confirm the performance of the at least the portion of the retraction procedure if the climb rate does not meet the criterion, and
   inhibit the performance of the at least the portion of the retraction procedure if the climb rate meets the criterion.

10. A method of operating a controller of an aircraft system of an aircraft during a take-off procedure, the method comprising the controller automatically:
    receiving a signal indicative of a fault or failure of an engine in the aircraft during the take-off procedure; and
    causing a remedial action to be taken in response to the signal, wherein the remedial action includes performing at least a portion of a retraction procedure to retract a landing gear of the aircraft,
    wherein the at least one signal indicates that an operating condition of the engine is beyond a predetermined range or a predetermined threshold.

11. The method according to claim 10, wherein the at least one signal comprises engine parameter information representative of at least one of:
    a temperature or pressure of engine oil in the engine;
    a vibration of at least part of the engine;
    a spool speed of the engine;
    a temperature of exhaust gas from the engine; or
    an engine pressure ratio of the engine.

12. The method of claim 10, further comprising:
    receiving at least one additional signal during the take-off procedure indicative of a climb rate of the aircraft;
    determining if the climb rate meets a climb rate criterion,
    performing the at least the portion of the retraction procedure if the climb rate does not meet the criterion, and
    not performing the at least the portion of the retraction procedure if the climb rate meets the criterion.

13. An aircraft system for an aircraft, the aircraft system comprising:
    a sensor system configured to sense an engine parameter of an engine of the aircraft during a take-off procedure of the aircraft, and to output information representative of the engine parameter;
    a landing gear system configured to retract a landing gear of the aircraft; and
    a control system configured to:
        receive the information from the sensor system; and
        determine, during the take-off procedure, if there is a fault or failure of the engine based on the information, and
        cause the landing gear system to perform at least a portion of a retraction procedure to retract the landing gear of the aircraft, in response to the determination of the fault or the failure.

14. The aircraft system of claim 13, wherein the controller is further configured to:
    receive at least one additional signal during the take-off procedure indicative of a climb rate of the aircraft;
    determine if the climb rate meets a climb rate criterion,
    confirm the performance of the at least the portion of the retraction procedure if the climb rate does not meet the criterion, and
    inhibit the performance of the at least the portion of the retraction procedure if the climb rate meets the criterion.

* * * * *